(12) United States Patent
Kuo

(10) Patent No.: US 7,870,280 B2
(45) Date of Patent: Jan. 11, 2011

(54) SYNCHRONIZED VIEWING OF FILE MANIPULATIONS

(75) Inventor: Eric E. Kuo, Foster City, CA (US)

(73) Assignee: Align Technology, Inc., San Jose, CA (US)

( * ) Notice: Subject to any disclaimer, the term of this patent is extended or adjusted under 35 U.S.C. 154(b) by 329 days.

(21) Appl. No.: 11/983,271

(22) Filed: Nov. 8, 2007

(65) Prior Publication Data

US 2009/0125566 A1 May 14, 2009

(51) Int. Cl.
*G06F 17/11* (2006.01)

(52) U.S. Cl. .................. 709/231; 709/204; 709/205; 382/293; 345/522; 345/555; 345/502

(58) Field of Classification Search .................. 709/231, 709/204–207, 227–229, 219; 379/93.19; 345/471, 948, 537, 551, 501–502, 522, 555, 345/733; 382/276, 293, 294, 295, 298, 299, 382/307
See application file for complete search history.

(56) References Cited

U.S. PATENT DOCUMENTS

| | | | |
|---|---|---|---|
| 5,577,188 A * | 11/1996 | Zhu ............................ 715/745 |
| 6,425,126 B1 | 7/2002 | Branson et al. |
| 7,340,534 B2 * | 3/2008 | Cameron et al. ............ 709/246 |
| 7,466,958 B2 * | 12/2008 | Dunk et al. .................. 434/362 |
| 7,584,199 B2 * | 9/2009 | Matsusaka ................... 707/101 |
| 2003/0028588 A1 * | 2/2003 | McConnell et al. ......... 709/203 |
| 2003/0105816 A1 * | 6/2003 | Goswami ..................... 709/204 |
| 2005/0246154 A1 | 11/2005 | Kass et al. |
| 2006/0115803 A1 * | 6/2006 | Kalisiak ...................... 434/323 |
| 2006/0168356 A1 * | 7/2006 | Mairs et al. .................... 710/1 |
| 2007/0160342 A1 * | 7/2007 | Yoo et al. ...................... 386/83 |

* cited by examiner

*Primary Examiner*—Wing F Chan
*Assistant Examiner*—Ruolei Zong
(74) *Attorney, Agent, or Firm*—Brooks, Cameron & Huebsch, PLLC

(57) ABSTRACT

Embodiments include computing device readable mediums, computing devices, and methods for synchronized viewing of file manipulations. One method embodiment includes creating a synchronized session between computing devices. The method further includes distributing copies of a file from one computing device to another and allowing each computing device to locally manipulate the file. According to the method, manipulating the file on a first computing device initiates a data stream including executable instructions for manipulating the file on a second computing device. The method also includes forwarding the data stream to the second computing device and manipulating the file according to the data stream received. The method further includes restricting manipulation functionality on the second computing device to the file based on the forwarded data stream, where the restriction of the manipulation functionality does not interrupt functionality of each computing device outside the file.

21 Claims, 6 Drawing Sheets

| 210 HIERARCHY | STUDENT | PRIORITY | TEACHER | PRIORITY | OBSERVER | PRIORITY |
|---|---|---|---|---|---|---|
| GLOBAL MANIPULATION | YES | 2 | YES | 1 | NO | X |
| LOCAL MANIPULATION | YES | X | YES | X | YES | X |

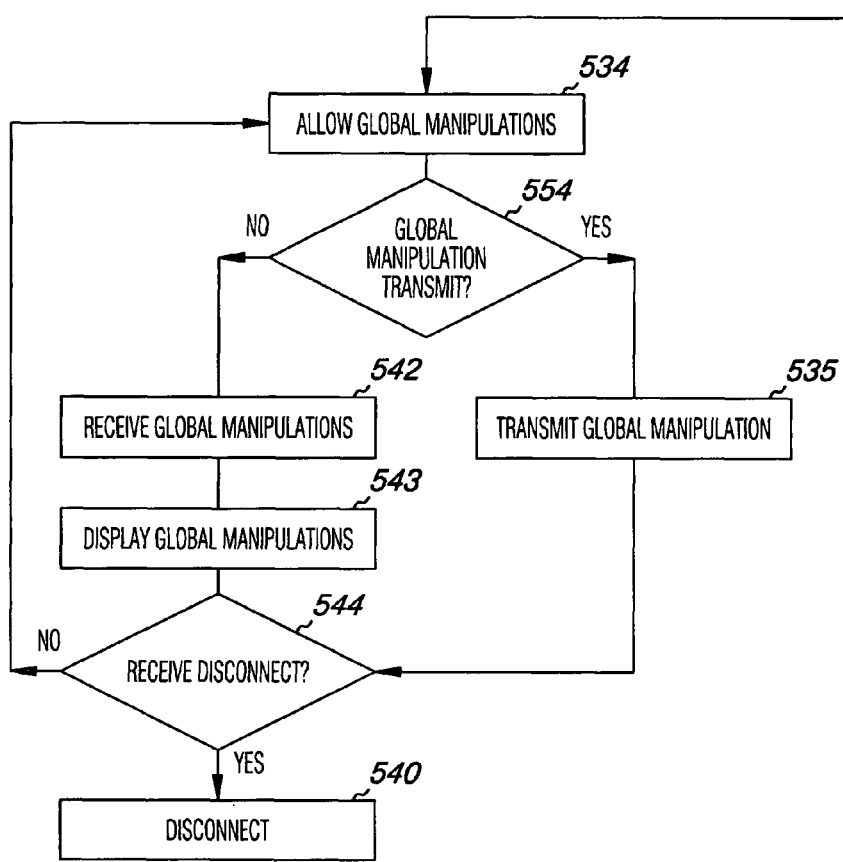

SYNCHRONIZED VIEWING OF FILE MANIPULATIONS

BACKGROUND

The present disclosure relates generally to devices, files, mediums, and methods for networked computing device applications. More specifically, this disclosure relates to synchronized viewing of file manipulations.

Often, in an instructor-instructee setting, for example, the instructor and instructee cannot be in the same physical location. Phone consultations or online chats have been used to convey information from the instructor to the instructee on a given subject. Often, the information to be conveyed can be displayed on a user interface of a computing device that is executing computer readable instructions (e.g., software).

However, the instructor is, in some instances, limited in ability to quickly, accurately, and/or efficiently convey substantive information to the instructee through use of such systems. Such limitations occur, for example, because the instructor must first focus attention on communicating preliminary information drawing the instructee's attention to various files to be discussed.

Furthermore, the instructee is limited in ability to convey information regarding files back to the instructor. Files in such systems may contain images, documents, moving pictures, or other user viewable presentations of instructional information. This can be because remote control information technology (IT) applications give full control of an instructee's computing device to a remote instructor.

BRIEF DESCRIPTION OF THE DRAWINGS

FIGS. 5A and 5B provide a flow chart illustrating another process for supporting interactions among networked computing devices for synchronized viewing of file manipulations that can be used with embodiments of the present disclosure.

DETAILED DESCRIPTION

Embodiments of the present disclosure include computing device readable mediums, computing devices, and methods for synchronized viewing of file manipulations. For example, one embodiment includes a computing device readable medium having executable instructions to be executed by a processor to cause a computing device to perform a method.

Some such methods include creating a synchronized session between computing devices. Such methods can include distributing copies of a file from one computing device to another and allowing each computing device to locally manipulate the file.

Instructions for executing such a method can be provided to one or more computing devices thereby providing some or all functions to the computing devices. Manipulating the file on a first computing device can include initiating a data stream including executable instructions for manipulating the file on a second computing device. Methods can include forwarding the data stream to the second computing device and manipulating the file according to the data stream received.

In some embodiments, such a method can include restricting manipulation functionality on the second computing device to the file based on the forwarded data stream, where the restriction of the manipulation functionality does not interrupt functionality of each computing device outside the file. For example, a user of the second computing device could maintain full control of other programs running on the second computing device, e.g., an email access program or a word processing program.

Some embodiments include establishing a hierarchy between the first and second computing devices with regard to who has the ability to manipulate the file. For instance, the second computing device can have a higher priority in manipulating the file than the first computing device.

In some embodiments, in the event of simultaneous access or global control, the computing device with the highest priority can be used to determine who receives control. This can be beneficial, for example, in helping to prevent erratic manipulations of the file from conflicting data streams.

When the computing device with higher priority has completed its manipulations, the computing device with the next highest priority can be allowed to gain control of the synchronized file, in some embodiments.

Embodiments of the present disclosure also include a number of computing device embodiments, such as a computing device with a processor, memory, and executable instructions that can be stored in memory and executed by the processor to perform a method. The computing device can include instructions for receiving a copy of a file from a computing device and manipulating the file locally using local controls on the computing device.

Figure 1A:
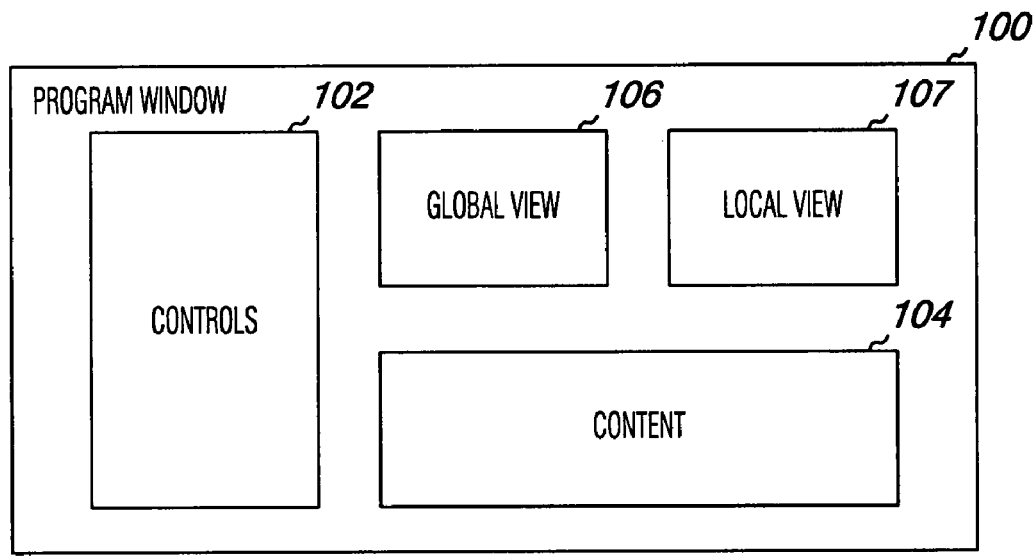
FIG. 1A illustrates an example of a user interface that can be used with embodiments of the present disclosure.

FIG. 1A illustrates an example of a user interface (UI) that can be used with embodiments of the present disclosure. In the UI of FIG. 1A, a program window 100 provides an interface for a program such as an orthodontic treatment program like ClinCheck, available from the dental appliance fabrication company Align Technology, Inc. of Santa Clara, Calif. The program window 100 can include controls 102, content 104, a global view 106, and/or a local view 107 among other viewing options and control mechanisms.

The controls 102 can include, for example, control buttons similar to those on a conventional video cassette recorder (VCR). For instance, the controls 102 can include a "play" button that, when selected, causes an animation routine to element through a number of images associated with a common file. The controls 102 can also include a "element forward" and/or "element backward" button to allow a user to move to the next and/or previous image associated with the common file.

The controls 102 can also include a "stop" button to allow a user to freeze the image currently presented in the local view window 107 or global view window 106, if authorized. A "record" button can be included to allow a user to save a copy of the synchronized session, if authorized.

The controls 102 can also include zoom controls, allowing a user to view an image more as a close-up view or reduce it to a more distant view. Rotational controls can also be included to allow a user to change the orientation of an image.

On-screen drawing controls can be included to allow a user to mark features on an image. A timer for tracking elapsed time during a synchronized session can be included within the controls 102.

Various other controls for modifying the presentation, appearance, or contents of a file, among other applications, can be included within the controls 102. The controls described herein are intended as examples and not as limitations.

The content 104 can include, for example, interactive features. Interactive features can, for example, include a text box for entering and receiving text messages between users of the synchronized session.

Other interactive features can include a voice-chat function, such as voice over Internet protocol (VoIP), including volume, mute, and/or on/off controls. A VoIP feature can transmit and receive via the same stream as the file data stream, or an independent stream. A VoIP feature can be synchronized therewith to avoid latency problems that can occur with varying speeds between voice and data streams.

Interactive features can include an ability for a user to rate other users. For example, students can assign a performance rating to a teacher, patients to a doctor, doctors to a supplier, etc.

Figures 2, 3:
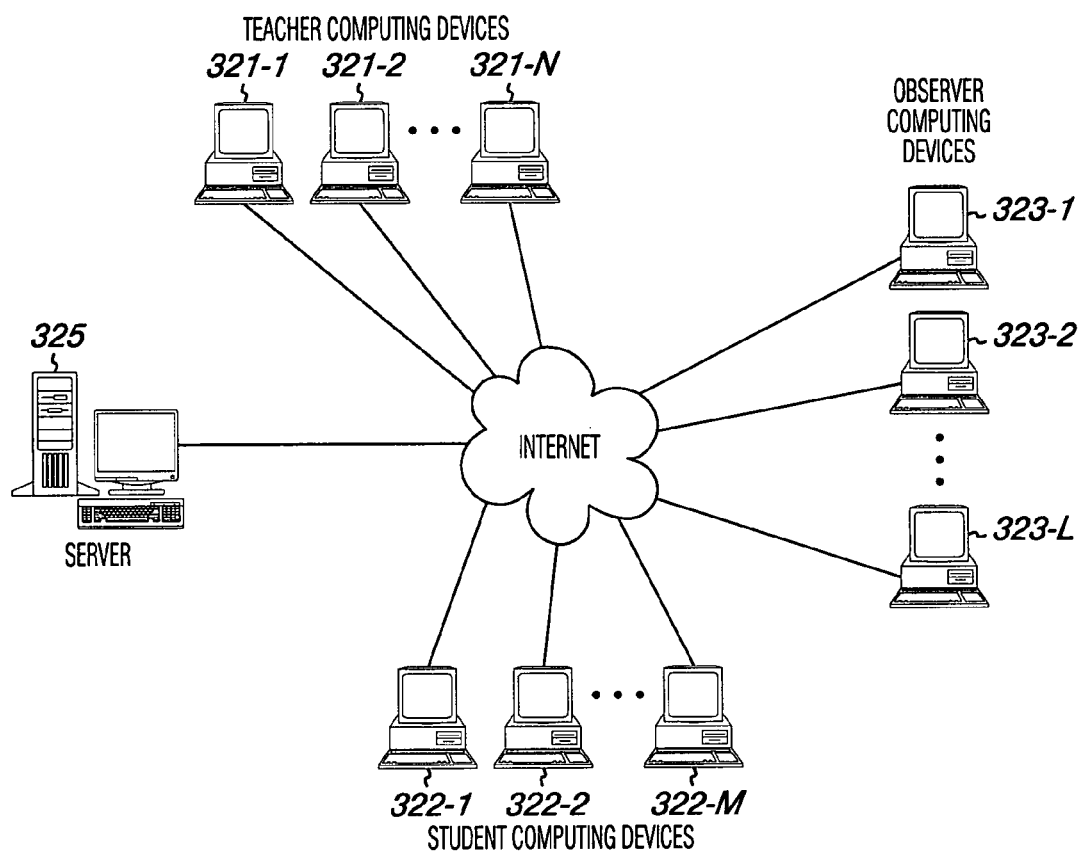
FIG. 2 illustrates a table of hierarchical relations between computing devices that can be used in accordance with embodiments of the present disclosure.
FIG. 3 is an illustration of an embodiment of a computing device network in which certain embodiments of the present disclosure can be implemented.

In some embodiments, such ratings can be stored in a data server (e.g., server 325 in FIG. 3). In various embodiments, a rating for a user can be viewable from a profile stored for the user, as is described in more detail below.

The content 104 can include, for example, a list of account names that the case would be passed to. The list can include the ability for an authorized user to send electronic invitations to the account names where the recipients of an invitation would be required to accept the invitation in order to connect to the session. If the initiator terminates the session, then all connections to invited users would be terminated.

In some embodiments, instructions can be executed such that content 104 displays targeted advertising to a user of a computing device. Targeted advertising can include, for example, text, images, moving images, and/or sounds as advertisements for products and/or services in a market geared toward a user. In some embodiments, a particular type of advertisement can be displayed based on the type of user, (e.g., a student, teacher, etc.).

The program could function such that invitees are only able to view the common file without downloading a copy of it, and that upon termination of the session, the data would be deleted from cache without being saved. Such features could reside within a preferences menu of the program, to be controlled by an authorized user, or other individual.

A global view 106 can, for example, be a window within the program window 100 that displays a synchronized view of the common file. A common file can, for instance, be manipulated by authorized users, such as, for example, an instructor, teacher, or student. When such a common file is manipulated by a user who is authorized to manipulate the file globally, in some embodiments, all users who are logged into the synchronized session view the changes made by the authorized user in global view 106.

A local view 107 can be configured to allow any user, whether authorized to make global changes to the common file or not, to manipulate the common file locally. When the common file is manipulated by a user in the local view 107, only that user sees the manipulations to the common file.

Such manipulations are not transmitted to other users logged on to the synchronized session. Having both a local view 107 and global view 106 can be beneficial, for example, in allowing a user who is not authorized to change the common file globally, such as an "observer," to view the user's own manipulations locally while still being able to view changes being made to the common file globally by an authorized user, such as a student and/or instructor.

Figure 1B:
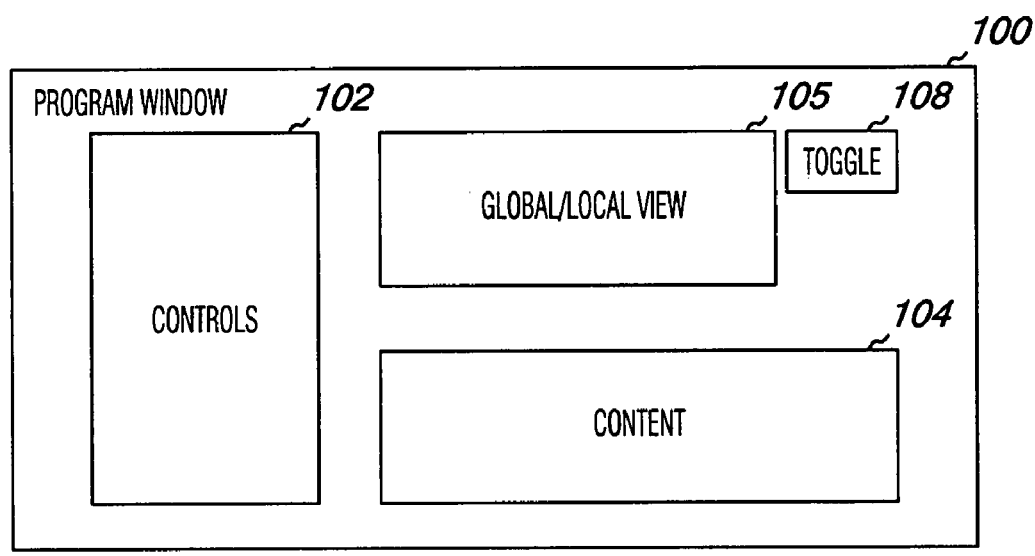
FIG. 1B illustrates an example of a user interface that can be used with embodiments of the present disclosure.

FIG. 1B illustrates an example of a user interface that can be used with embodiments of the present disclosure. In the UI of FIG. 1A, a program window 100 provides controls 102, interactive content 104, a global/local view 105, and a toggle 108. In the illustrated embodiment of FIG. 1B, the program window 100, controls 102, and content 104 can be operable as described above with respect to FIG. 1A.

In the embodiment illustrated in FIG. 1B, the global view 106 and local view 107, illustrated and described in connection with FIG. 1A, are combined into one window, global/local view 105. The global/local view 105 can display a view of the common file as it is being manipulated globally by an authorized user, or a view of the common file as it is being manipulated locally by the user. The user can use toggle 108 to switch between global/local views 105 of the common file as it is being manipulated globally or locally.

In some embodiments, distributing copies of the file from the first computing device to the second computing device includes distributing view-only copies. Such functionality can be provided by one or more executable instructions. Distributing view-only copies can prevent computing devices that receive view-only copies from manipulating the synchronized file.

In some embodiments, computing devices that receive view-only copies may include executable instructions that allow a user to manipulate the file locally. That is, view-only copies may be manipulated on the local computing device such that no manipulations are transmitted to other computing devices.

Some embodiments allow the first computing device to terminate the session. In some embodiments, if the session is terminated, all connections are lost and the session is over. In such embodiments, if the session is terminated, no further interactions continue. In some embodiments, the file data is downloaded into cache at initiation of the session, and is deleted upon termination of the session without being saved.

FIG. 2 illustrates a table 210 of hierarchical relations between computing devices that can be used in accordance with embodiments of the present disclosure. The table 210 includes a hierarchical priority structure between various users such as a student, a teacher, and/or an observer for both global manipulation and local manipulation of a common file.

According to the embodiment illustrated in FIG. 2, either a student or a teacher is authorized to manipulate the common file globally, while an observer is not. According to such an embodiment, any manipulation of the common file by a teacher or student would be transmitted to all other users of the synchronized session.

According to the embodiment described in FIG. 2, the teacher has priority level 1 and the student has priority level 2. In the even that both a teacher and student try to manipulate the common file globally at the same time, the teacher's manipulations would be transmitted to other users because the teacher has a higher priority level.

Once the user with a higher priority level, such as a teacher, stops manipulating the file globally, a user with a lower priority level, such as a student, would be allowed to manipulate the file globally. Embodiments are not limited to this example. The operation of the synchronized session can be structured to allow for various priority levels and authorizations between users.

FIG. 2 also illustrates an embodiment where all users are authorized to manipulate the common file locally. Because local manipulations of the common file are not transmitted to other users of the synchronized session, there are no priority levels associated with local manipulations, in various embodiments.

In some embodiments, the entire file need not be transmitted every time a change is made by one or more of the users. In some embodiments, a portion of the file can be transmitted, thereby potentially reducing the amount of bandwidth, processing overhead, and time for updating, among other benefits. In some embodiments, instructions regarding the manipulations to be accomplished can be transmitted.

For example, in some embodiments, receiving a data stream including global manipulation instructions for manipulating the file to mirror a manipulation that has been initiated on the computing device can include receiving global manipulation instructions that include positional information that can be used with locally stored graphical information to manipulate the file. Such embodiments may provide the same and/or other benefits as those described above.

Computing device embodiments can include instructions for receiving a data stream including global manipulation instructions for manipulating the file to mirror a manipulation that has been initiated on the computing device, in some embodiments. Such a computing device can also include instructions for manipulating the file on the computing device according to the data stream received and/or overriding the local manipulations with the global manipulation instructions received with the data stream.

Some embodiments include allowing local manipulation functionality to other files on the computing device regardless of receipt of the data stream. This can be beneficial, for example, in allowing local control of the computing device's other functionalities. In such embodiments, the data stream including global manipulation instructions pertains only to the synchronized session that has been established.

In some embodiments, an origination device of the data stream can be identified. In such embodiments, the global manipulation instructions can be associated with the originating device. In these embodiments a visual, textual, and/or audible user identifier can be used to notify all participants which computing device has taken control and is making the global manipulations.

Various embodiments include distributing and receiving executable instructions for displaying text comments via the data stream. This can be beneficial, for example, in allowing a text dialogue between users of the computing devices. Such a dialogue can be used, for example, as a question-and-answer session or as a mechanism for communicating instructions regarding the common file.

Various embodiments can also include the ability to save the executable instructions for displaying comments, e.g., text comments, distributed and received. Such embodiments can also include the ability to match the executable instructions for displaying the comments received and distributed with the global manipulation instructions to a file. This can be beneficial, for example, in allowing a user of a computing device to retrospectively analyze the synchronized session for learning and evaluation purposes, among other benefits.

Some embodiments can include distributing and receiving executable instructions for providing voice comments to a device user via the data stream. Providing voice comments can, for example, be in the form of a voice-over-Internet-protocol (VoIP), among others. In such embodiments, the voice stream can be synchronized with the global manipulation data stream to help avoid latency problems that could occur if the speeds of the voice and data streams are not equal.

In some embodiments, the file can include executable instructions to implement a first set of visual controls to manipulate the file locally and a second set of visual controls to manipulate the file globally. In such embodiments, local control could be allowed only when no data is present in the global data stream to maintain priority for the global data stream.

Such embodiments can also include the ability to restrict which set of controls a user may access. For example, and not by way of limitation, a student could have access only to local controls, while an instructor could have access to both local and global controls. This can be beneficial, for example, in maintaining priority between users and improving functionality of the synchronized session by reducing interference of the global controls.

Embodiments of the present disclosure also include methods of synchronized viewing of file manipulations. Such methods can, for example, include creating a synchronized session between a student computing device and at least one of a teacher computing device and/or an observer computing device.

Such methods can include sending a file from the student computing device to at least one of the teacher computing device and/or the observer computing device and allowing each computing device to manipulate the file locally. Methods can also include receiving a data stream including executable instructions for manipulating the file from at least one of the teacher computing device and/or the student computing device.

In such embodiments, one of the computing devices can manipulate the file globally on all computing devices of the synchronized session according to the data stream received. Methods can also include overriding the local manipulations to the file based on the data stream received, where the receipt of the data stream, the manipulation of the file globally, and the override of local manipulations does not interrupt functionality of each computing device on programs outside the file.

Some embodiments include an established hierarchy of control of manipulation of the file. Such a hierarchy can include the teacher computing device being higher in the hierarchy than the student computing device. In order to accomplish such a hierarchy where a computing device is higher in the hierarchy, for example, a data stream can be used, including executable instructions for manipulating the file having precedence over the data stream including executable instructions for manipulating the file from the computing device lower in the hierarchy.

Such a hierarchy can be beneficial, for example, in allowing multiple users to manipulate the global data file independently, while maintaining consistent model movement behavior without erratic movement or conflicting controls. In such embodiments, after the user of the highest priority computing device has completed movements (e.g., control of the global file) the next highest priority computing device can be allowed to gain control of the global file.

The hierarchy can be used to provide an accept and/or ignore capability to a user, such that the user can accept and/or ignore manipulations to the common file on the user's interface. In one or more embodiments, the accept and/or ignore capability can, for example, be used to accept and/or ignore communications sent from a particular user (e.g., text messages and/or VOIP communications).

In some embodiments, the observer computing device can be allowed to manipulate the file locally, but can be blocked from sending a data stream including instructions for manipulating the file globally. In some such embodiments, this can be a configurable (e.g., by a user, administrator, instructor, etc.).

This can be accomplished through use of executable instructions. Such embodiments can be useful, for example, in allowing multiple users to observe the synchronized session while minimizing the total number of computing devices with control over the global file.

Various embodiments can include one or more teacher and/or instructor computing devices. Some embodiments can also include one or more student computing devices and/or one or more observer computing devices. The number of computing devices is not limited by this disclosure.

Various embodiments can also include a synchronized session created between a student computing device, at least one teacher computing device, and an observer computing device where the student computing device is enabled to terminate the session. Such embodiments can be useful, for example, in securing the synchronized session.

For example, if the initiator terminates the session, then all connections can be terminated and the session is over. No further interactions between users are then possible through the synchronized session.

Some embodiments can include a session timer to log the amount of interaction between the parties. Such a timer can be useful, among other reasons, in the event that a service charge is being rendered for instruction time.

Other embodiments can include on screen drawing tools operable by a user of a computing device with the ability to manipulate the global file. Such tools can be useful, for example, to manipulate the global file with images such as squares, circles, letters, arrows, and/or other shapes, and/or in different colors and/or densities. Such tools can be used to draw an observer's attention to particular features of the global file, among other uses.

FIG. 3 is an illustration of an embodiment of a computing device network in which certain embodiments of the present disclosure can be implemented. As shown in FIG. 3, a number of devices can be connected to each other over a number of network connections. For example, several computing devices could be networked to each other over a local area network (LAN), wide area network (WAN), metropolitan area network (MAN), including the Internet, or various other network connections and/or combinations of network connections. Embodiments are not limited to the example embodiment illustrated in FIG. 3.

FIG. 3 illustrates a number of teacher computing devices 321-1, 321-2, . . . , 321-N connected to the Internet. A teacher computing device, such as teacher computing device 321-1 represents a computing device operated by a user with authorization to manipulate the common file globally with priority level 1 as illustrated in FIG. 2.

FIG. 3 also illustrates a number of student computing devices 322-1, 322-2, . . . , 322-M connected to the Internet. A student computing device, such as student computing device 322-1 represents a computing device operated by a user with authorization to manipulate the common file globally with priority level 2 as illustrated in FIG. 2.

FIG. 3 also illustrates a number of observer computing devices 323-1, 323-2, . . . 323-L connected to the Internet. An observer computing device, such as observer computing device 323-1 represents a computing device operated by a user without authorization to manipulate the common file globally as illustrated in FIG. 2.

The examples provided above of teacher, student, and observer computing devices are illustrative and not limiting as examples of the types of users that may be associated with various embodiments of the present disclosure. For example, suppliers and/or laboratory users could utilize a similar network or connect to the network illustrated in the embodiment of FIG. 3. In such embodiments, information can be shared with suppliers and/or laboratory users to, for example, allow the users to quickly fill orders, develop and/or modify products, etc.

FIG. 3 illustrates a server 325 connected to various computing devices via an Internet connection. The server 325 can be an application server host that executes computing device readable instructions for performing the methods of the present disclosure. Server 325 as an application server can operate to run the program used to allow users to manipulate a common file locally and globally.

Server 325 can also be a data server, wherein each computing device executes computing device readable instructions allowing manipulation of a common file according to embodiments of the present disclosure. Server 325 as a data server functions to facilitate transfer of global manipulations between users of the synchronized session.

Server 325 can store patient records that can be shared among the users of various computing devices via the Internet connection. For example, the common file can include information stored in patient records in server 325.

In some embodiments, server 325 can store user profiles for users of the various computing devices illustrated in the embodiment of FIG. 3. Program instructions can be executed, for instance, such that a user of a computing device connected to server 325 can search user profiles stored in server 325. Such embodiments can be beneficial, for instance, in allowing a particular doctor to transfer a patient to another doctor having appropriate credentials and/or abilities.

Embodiments are not limited to the example illustrated in FIG. 3. Embodiments of the present disclosure can be performed using one or more of the various computing devices as a host without a connection to a server. Alternatively, a server 325 can be networked to one or more computing devices via a LAN, WAN, MAN, and/or a number of other networking options.

Figure 4:
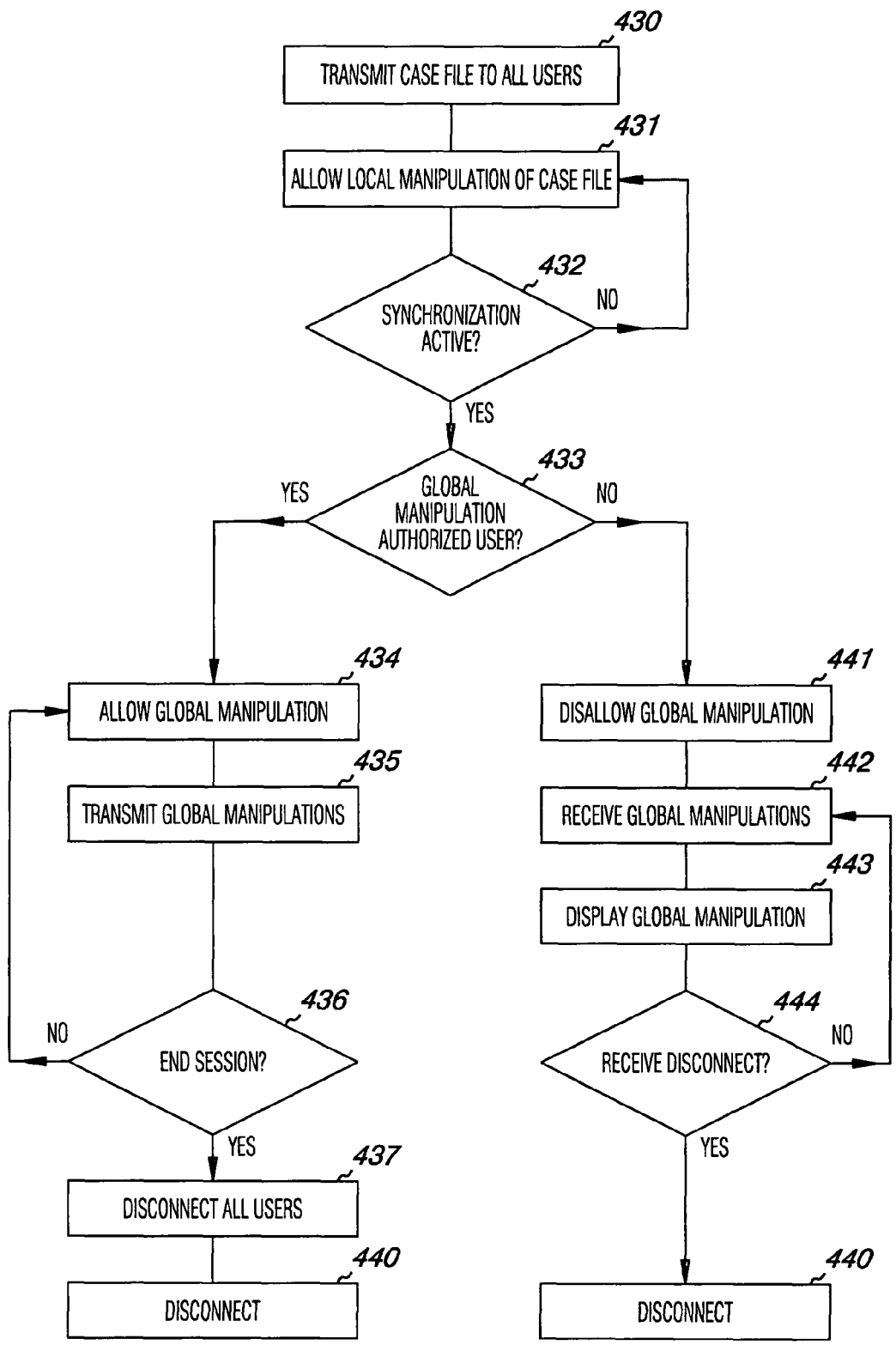
FIG. 4 provides a flow chart illustrating a process for supporting interactions among networked computing devices for synchronized viewing of file manipulations that can be used with embodiments of the present disclosure.

FIG. 4 provides a flow chart illustrating a process for supporting interactions among networked computing devices for synchronized viewing of file manipulations that can be used with embodiments of the present disclosure. In the example illustrated in FIG. 4, one computing device user is authorized to make global manipulations to the common file. The other computing devices are considered observer computing devices, such as observer computing device 323-1 in the example illustrated in FIG. 3.

In the example of FIG. 4, a program, such as ClinCheck transmits a case file to all computing device users of the synchronized session at element 430. Once the case file has been transmitted, it is common to all users of the session. In such an example, users of the synchronized session are allowed to manipulate the common file locally according to element 431.

The initiating computing device user may use the computing device to execute instructions to synchronize the session at element 432. Synchronizing the session can, for example, include starting the data stream including computing device readable instructions containing global manipulations of the common file by authorized users.

If the session is not synchronized, the process can be designed to return to element 431 where all users may manipulate the common file locally. If the session is synchronized, the program can be designed to check for authorization to manipulate the file globally at element 433.

If a user attempting global manipulations to the common file is authorized to do so, the process can be designed to proceed to element 434 to allow global manipulations by the user. If a user attempting global manipulations is not authorized, the process can be designed to proceed to element 441 where global manipulations are disallowed for that user.

After global manipulations are allowed at element 434, any global manipulations initiated by a user can be transmitted to all other users of the synchronized session at element 435. The synchronized session continues in this fashion, where an authorized user is allowed to make global changes when the user does not choose to end the session at element 436. When the user chooses to end the session at element 436, all users are disconnected at element 437, including the authorized user at element 440.

For users not authorized to make global manipulations at element 433, global manipulations can be disallowed at element 441. Users not authorized to make global manipulations, ("observers" in FIG. 2), receive global manipulations from authorized users at element 442.

After receiving global manipulations transmitted from authorized users, the observer computing device can display the global manipulations to the user at element 443. The synchronized session can continue in this fashion until an authorized user ends the session and disconnects all users at element 437.

At this point, observer computing devices receive a disconnect instruction at element 444. After receiving the disconnect instruction, the observer computing device can be disconnected at 440 and the session is terminated. The above process elements can, for example, be accomplished by one or more instructions executable by a processor of a computing device that can be initiated by a user of a computing device or automatically.

Figure 5B:
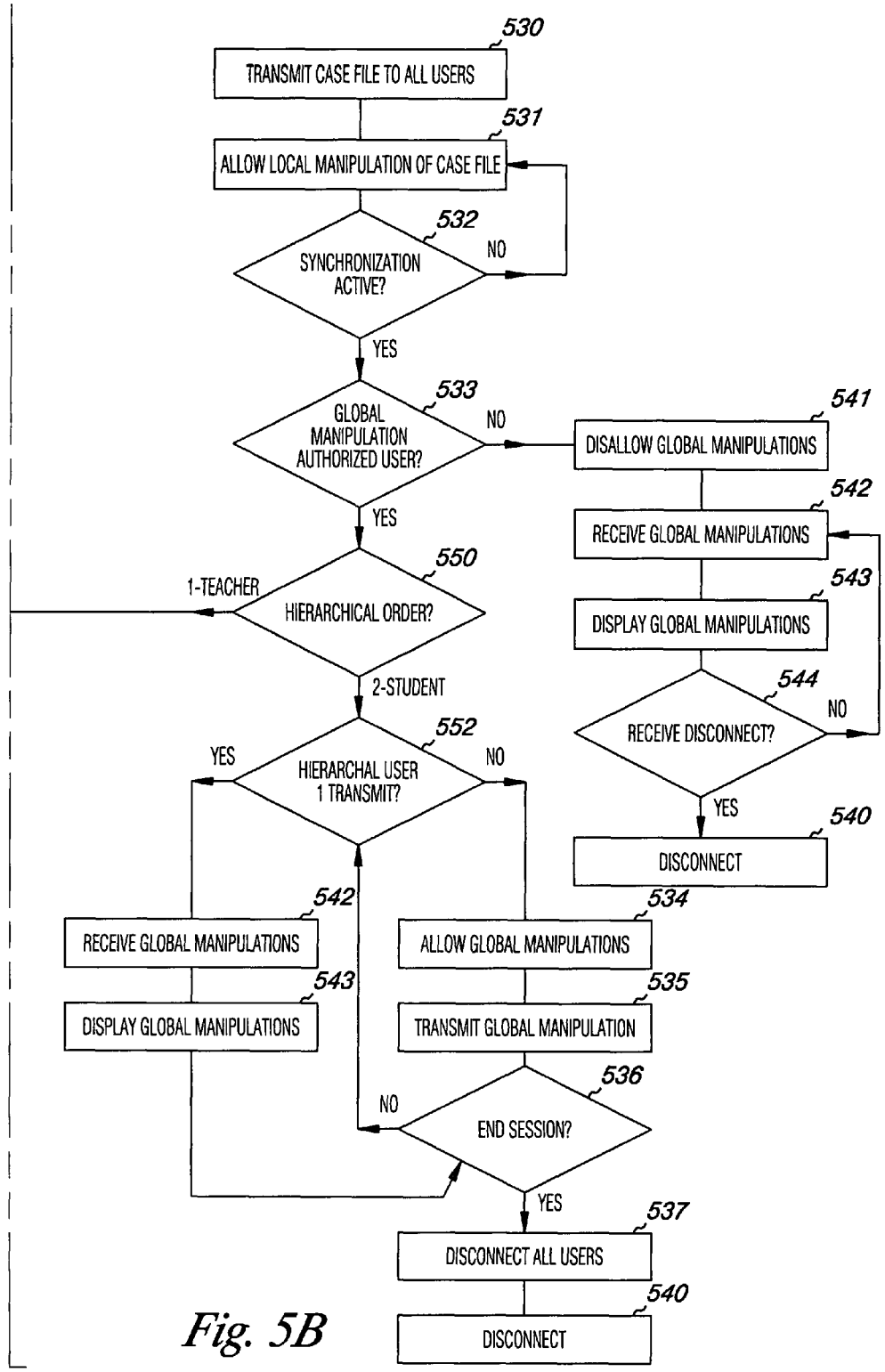

FIGS. 5A and 5B provide a flow chart illustrating another process for supporting interactions among networked computing devices for synchronized viewing of file manipulations that can be used with embodiments of the present disclosure. In the example of FIGS. 5A and 5B, at least two computing device users with different priority levels are authorized to make global manipulations to the common file. Other computing devices not authorized to make global manipulations to the common file are considered observer computing devices, such as observer computing device 323-1 in FIG. 3.

In the example of FIGS. 5A and 5B, a program, such as ClinCheck transmits a case file to all computing device users of the synchronized session at element 530. Once the case file has been transmitted, it is common to all users. All users of the synchronized session are allowed to manipulate the common file locally according to element 531.

The initiating computing device user may initiate the computing device to execute instructions to synchronize the session at element 532. Synchronizing the session can include starting the data stream including computing device readable instructions containing global manipulations of the common file by authorized users.

If the session is not synchronized, the process can return to element 531 where all users can manipulate the common file locally. If the session is synchronized, the program can check for authorization to manipulate the file globally at element 533.

Similar to the embodiment of FIG. 4, if a user attempting global manipulations to the common file is not authorized to do so, the process can proceed to element 541 where global manipulations are disallowed. Users not authorized to make global manipulations, ("observers" in FIG. 2), can receive global manipulations from authorized users at element 542.

After receiving global manipulations transmitted from authorized users, the observer computing device can display the global manipulations to the user at element 543. The synchronized session can continue in this fashion until an authorized user ends the session and disconnects all users at element 537.

At this point, observer computing devices can receive a disconnect instruction at element 544. After receiving the disconnect instruction, the observer computing device can be disconnected at 540 and the session can be terminated.

If a user attempting global manipulations, at element 533, to the common file is authorized to do so, the process can proceed to element 550 where a determination of hierarchical order can be made, similar to table 210 of FIG. 2. In this example, a computing device user with priority level 1, such as a "teacher" can be allowed to perform global manipulations at element 534.

If the teacher computing device, such as teacher computing device 321-1 in FIG. 3, performs global manipulations at element 554, they can be transmitted to all other users of the synchronized session at element 535. After transmitting, if the teaching computing device does not receive a disconnect instruction at element 544, the process can return to element 534 to allow global manipulations for the teacher computing device.

If the user of the teaching computing device does not transmit global manipulations at element 554, the computing device can execute instructions to allow it to receive global manipulations from other users authorized to send them at element 542. When global manipulations are received at element 542, the computing device can display them to the user at element 543.

If the computing device does not receive a disconnect instruction from the computing device of the initiator of the session, the process can return to element 534 to allow global manipulations. When the teaching computing device receives a disconnect instruction at element 544, it can be disconnected at element 540.

Turning back now to element 550, if the computing device authorized to make global manipulations has priority level 2, such as a "student" computing device, a determination can be made at element 552 as to whether a computing device with a higher priority level is transmitting global manipulations. If a computing device with a higher priority level, for example, a teaching computing device, is transmitting global manipulations, then the student computing device can be configured to receive global manipulations at element 542. After global manipulations are received at 542, the computing device can display the manipulations to the user at element 543.

If the session does not end at element 536, the process can return to element 552 for another determination of whether a user with a higher hierarchical priority level is transmitting global instructions. If no such user is transmitting, then the process can proceed to element 534 to allow the student computing device to make global manipulations to the common file. When global manipulations are made, they can be transmitted to all users of the synchronized session at element 535.

In the example of FIGS. 5A and 5B, a user of a computing device with hierarchical priority level 2, such as a student, initiated the synchronized session. Therefore, the student has the authority to terminate, e.g., end the session for all users at element 536. If the student does not end the session at element 536, the process can return to element 552 to determine whether a user with a higher priority level is transmitting. If the initiator chooses to end the session, the student computing device, in this example, can send a disconnect instruction all users at element 537. The student computing device then can be disconnected at element 540.

Figure 6:
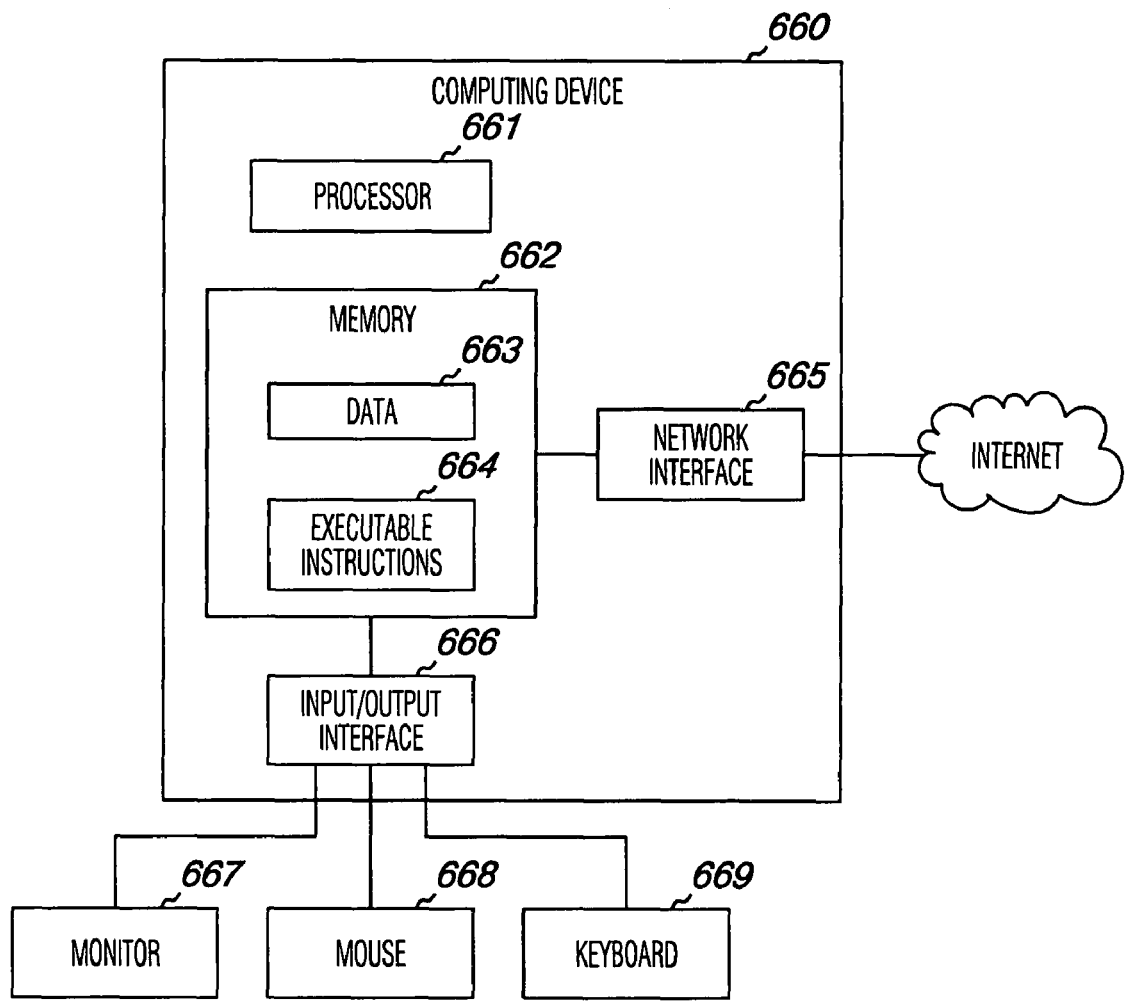
FIG. 6 illustrates a computing device embodiment to perform a method embodiment of the present disclosure.

FIG. 6 illustrates a computing device embodiment to perform the methods of the present disclosure. The computing device 660 illustrated in FIG. 6, includes a processor 661 and memory 662. Memory 662 can include various types of information including data 663 and executable instructions 664 as discussed herein.

Memory can be used for a variety of different functions in the various embodiments. For example, memory can be used to store executable instructions that can be used to interact with the other components of the network including other computing devices and can be used to store information, such as instructions for manipulating one or more files.

For instance, in some embodiments, a computing device can include executable instructions for saving a number of manipulations to one or more files in memory. Such instructions can for example be instructions for saving local manipulations, global manipulations, manipulations from another computing device, or a combination of two or more of these.

In various embodiments, one or more of the steps taken during the manipulations by one or more computing devices can be saved. Such embodiments, can allow a user, for example, to review teaching session or an idea provided by another student. Such embodiments can also allow the user to replay a session at a later date.

Additionally, as illustrated in the embodiment of FIG. 6, a system can include a network interface 665. Such an interface can allow for processing on one or more networked computing devices or such devices can be used to transmit and/or receive global manipulations and/or executable instructions for use with various embodiments provided herein.

As illustrated in the embodiment of FIG. 6, a system can include one or more input and/or output interfaces 666. Such interfaces can be used to connect the computing device with one or more input and/or output devices. For example, in the embodiment illustrated in FIG. 6, the system includes connectivity to a monitor 667, a mouse 668, and a keyboard 669.

Such connectivity can allow for the input and/or output of global manipulations (e.g., changes to the common file embedded in executable instructions) among other types of information. Although some embodiments may be distributed among various computing devices within one or more networks, such systems as illustrated in FIG. 6 can be beneficial, for example, in allowing for the capture, calculation, and/or analysis of the various information discussed herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory tangible computing device readable medium having executable instructions to be executed by a processor to cause a computing device to perform a method, comprising:
    creating a synchronized session between a first computing device and at least a second computing device;
    allowing each computing device to locally manipulate a file during the synchronized session;
    globally manipulating the file on the first computing device during the synchronized session, where the global manipulation initiates a data stream including executable instructions for manipulating the file on the second computing device;
    forwarding the data stream to the second computing device and manipulating the file synchronously with the global manipulation on the first computing device according to the data stream received during the synchronized session;
    restricting a local manipulation functionality on the second computing device to the file based on the forwarded data stream, where the restriction of the local manipulation functionality does not interrupt functionality of each computing device outside the file during the synchronized session;
    establishing a hierarchy and assigning priority levels between the first computing device and the second computing device with regard to who has the ability to globally manipulate the file;
    allowing the one of the first or second computing device with higher priority to globally manipulate the file; and
    allowing one of the first or second computing device with the next-highest priority to gain control of the synchronized file only after the one of the first or second computing device with higher priority has completed its manipulations.

2. The medium of claim 1, where the second computing device has a higher priority in globally manipulating the file.

3. The medium of claim 1, where distributing copies of the file from the first computing device to the second computing device includes distributing a view-only copy of the file.

4. The medium of claim 1, where the method further includes allowing the first computing device to terminate the session.

5. A computing device, comprising:
    a processor;
    a memory;
    a display; and
    executable instructions storable in the memory and executable by the processor to perform a method, including:
        connecting to a synchronized session with a different computing device;

manipulating a file locally using local controls on the computing device during the synchronized session such that local manipulations are displayed on the display of the computing device, but are not transmitted to the different computing device;

receiving a hierarchy and assigned priority levels between the computing device and the different computing device with regard to who has the ability to globally manipulate the file;

gaining control of the synchronized file if the computing device is assigned the highest priority;

gaining control of the synchronized file only after the different computing device has completed its manipulations if the different computing device is assigned a higher priority than the computing device;

receiving a data stream including global manipulation instructions for manipulating the file to mirror a global manipulation that has been initiated on the different computing device during the synchronized session;

manipulating the file on the computing device according to the data stream received such that the global manipulation is displayed on the display of the computing device synchronously with the global manipulation initiated on the different computing device during the synchronized session; and overriding the local manipulations with the global manipulation instructions received with the data stream such that local manipulations of the file are restricted during the global manipulation.

6. The computing device of claim 5, where the method includes allowing local manipulation functionality to other files on the computing device during the global manipulation.

7. The computing device of claim 5, where the method includes identifying the different computing device and associating the global manipulation instructions with the different computing device.

8. The computing device of claim 5, where the method includes distributing and receiving executable instructions for displaying text comments via the data stream.

9. The computing device of claim 8, where the method includes saving the executable instructions for displaying text comments distributed and received and matching the executable instructions for displaying text comments received and distributed with the global manipulation instructions to the file.

10. The computing device of claim 5, where the method includes distributing and receiving executable instructions for providing voice comments to a device user via the data stream.

11. The computing device of claim 10, where the distribution and receipt of executable instructions for providing voice comments is synchronized with the global manipulations to the file.

12. The computing device of claim 5, where the file includes executable instructions to implement a first set of visual controls to manipulate the file locally and a second set of visual controls to manipulate the file globally.

13. The computing device of claim 5, where receiving the data stream including global manipulation instructions for manipulating the file to mirror the global manipulation that has been initiated on the different computing device includes receiving global manipulation instructions that include positional information that can be used with locally stored graphical information to manipulate the file.

14. The computing device of claim 5, where the method includes saving a number of manipulations to one or more files in memory, the number of manipulations selected from: the local manipulations, the global manipulations, manipulations from another computing device, or a combination of two or more of these.

15. The computing device of claim 14, where saving the number of manipulations to one or more files in memory includes saving one or more of the steps taken during the one or more manipulations by one or more computing devices.

16. A method of synchronized viewing of file manipulations, comprising:

creating a synchronized session between a student computing device and at least one of a teacher computing device and an observer computing device;

allowing each computing device to locally manipulate a file during the synchronized session;

receiving a data stream including device executable instructions for globally manipulating the file from a particular one of the teacher computing device and the student computing device during the synchronized session;

globally manipulating the file on all computing devices of the synchronized session synchronously with the global manipulation on the particular computing device according to the data stream received during the synchronized session; and overriding the local manipulations to the file based on the data stream received, where the receipt of the data stream, the global manipulation of the file, and the override of local manipulations does not interrupt functionality of each computing device on programs outside the file during the synchronized session;

establishing a hierarchy and assigning priority levels between the student computing device and the teacher computing device with regard to who has the ability to globally manipulate the file allowing one of the teacher or student computing device with higher priority to globally manipulate the file; and allowing the one of the teacher or student computing device with the next-highest priority to gain control of the synchronized file only after the one of the teacher or student computing device with higher priority has completed its manipulations.

17. The method of claim 16, where establishing the hierarchy includes a hierarchy where the teacher computing device is higher in the hierarchy, and the data stream including instructions for globally manipulating the file from the teacher computing device has precedence over the data stream including instructions for globally manipulating the file from the student computing device.

18. The method of claim 16, where the method includes allowing the observer computing device to locally manipulate the file, and blocking the observer computing device from sending a data stream including instructions for globally manipulating the file.

19. The method of claim 16, where there is more than one teacher computing device.

20. The method of claim 19, where there is more than one student computing device.

21. The method of claim 16, where creating the synchronized session between a student computing device and at least one of a teacher computing device and an observer computing device includes enabling the student computing device to terminate the session.

* * * * *